United States Patent
Song et al.

(10) Patent No.: US 12,382,416 B2
(45) Date of Patent: Aug. 5, 2025

(54) APPARATUS AND METHOD FOR SERVICE SUBSCRIPTION THROUGH E2 INTERFACE IN RADIO ACCESS NETWORK COMMUNICATION SYSTEM

(71) Applicant: Samsung Electronics Co., Ltd., Suwon-si (KR)

(72) Inventors: Junhyuk Song, Suwon-si (KR); Jeongyeob Oak, Suwon-si (KR); Chungkeun Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 578 days.

(21) Appl. No.: 17/711,729

(22) Filed: Apr. 1, 2022

(65) Prior Publication Data
US 2022/0225264 A1    Jul. 14, 2022

Related U.S. Application Data

(63) Continuation of application No. PCT/KR2020/013435, filed on Sep. 29, 2020.

(60) Provisional application No. 62/908,827, filed on Oct. 1, 2019.

(51) Int. Cl.
*H04W 60/00* (2009.01)
*H04W 8/18* (2009.01)
*H04W 88/06* (2009.01)

(52) U.S. Cl.
CPC .......... *H04W 60/005* (2013.01); *H04W 8/18* (2013.01); *H04W 88/06* (2013.01)

(58) Field of Classification Search
None
See application file for complete search history.

(56) References Cited

U.S. PATENT DOCUMENTS

| | | |
|---|---|---|
| 10,939,333 B2 | 3/2021 | Jin et al. |
| 11,159,982 B2 | 10/2021 | Rajagopal |
| 11,330,645 B2 | 5/2022 | Jin et al. |
| 2005/0015494 A1 | 1/2005 | Adamczyk et al. |
| 2015/0358866 A1 | 12/2015 | Xu et al. |

(Continued)

FOREIGN PATENT DOCUMENTS

| | | |
|---|---|---|
| CN | 111510959 A | 8/2020 |
| CN | 115004797 A | 9/2022 |

(Continued)

OTHER PUBLICATIONS

O-RAN Alliance, LS on O-RAN Alliance & 3GPP Coordination on O-RAN Alliance Outputs, 3GPP TSG RAN Meeting #85, RP-192259, Newport Beach, USA, Sep. 16-20, 2019.

(Continued)

*Primary Examiner* — Suhail Khan
(74) *Attorney, Agent, or Firm* — Jefferson IP Law, LLP

(57) ABSTRACT

The disclosure relates to a pre-5$^{th}$-Generation (5G) or 5G communication system to be provided for supporting higher data rates Beyond 4$^{th}$-Generation (4G) communication system such as Long Term Evolution (LTE). A method performed by an E2 node is provided. The method includes receiving a radio access network (RAN) intelligent controller (RIC) subscription request message from an RIC via an E2 interface, and the RIC subscription request message may include information indicating a network interface type.

24 Claims, 16 Drawing Sheets

(56) References Cited

U.S. PATENT DOCUMENTS

2019/0223154 A1 7/2019 Jia et al.
2019/0297652 A1 9/2019 Yang et al.
2022/0225066 A1 7/2022 Song et al.

FOREIGN PATENT DOCUMENTS

WO 2019/157885 A1 8/2019
WO 2019/183020 A1 9/2019

OTHER PUBLICATIONS

Indian Office Action dated Feb. 26, 2024, issued in Indian Application No. 202217025391.
Chinese Office Action dated Apr. 22, 2024, issued in Chinese Application No. 202080083160.0.
Czichy, "5G RAN optimization using the O-RAN software community's RIC (RAN Intelligent Controller)" Open Networking Summit (ONS) Europe 2019, Sep. 23, 2019.
Jana et al., "O-RAN SC Release A requirements" O-RAN Tokyo Workgroup Face-to-Face Meeting Information, Jun. 19, 2019.
Abeta et al., "O-RAN Alliance Standardization Trends" NTT Docomo Technical Journal, vol. 21, No. 1, 23019.07.
Schulz et al. "Network Architectures for Demanding 5G Performance Requirements" IEEE Vehicular Technology Magazine, vol. 14, Issue 2, Apr. 23, 2019.
Japanese Office Action dated Jul. 1, 2024, issued in Japanese Application No. JP2022-520519.
European Office Action dated Aug. 5, 2024, issued in European Application No. 20871980.7.
Chinese Office Action dated Sep. 9, 2024, issued in Chinese Application No. 202080083160.0.
O-RAN, working Group 3, "Near-Real-time, RAN Intelligent Controller, E2, Application Protocol (E2AP)" (XP009536365).
O-RAN, Working Group 3, "Near-Real-time RAN, Intelligent Controller, E2, Service Model, (E2SM)" XP009539264.
Extended European Search Report dated Oct. 6, 2022, issued in European Application No. 20871980.7.
Japanese Office Action dated Dec. 2, 2024, issued in Japanese Patent Application No. JP2022-520519.
Japanese Notice of Patent Grant dated May 7, 2025, issued in Japanese Patent Application No. JP2022-520519.

| IE/Group Name | Presence | Range | IE type and reference | Semantics description | Criticality | Assigned Criticality |
|---|---|---|---|---|---|---|
| Message Type | M | | x.x.x.x | | YES | reject |
| RIC REQUEST ID | M | | x.x.x.x | | YES | reject |
| E2 NODE FUNTION ID | M | | x.x.x.x | | YES | reject |
| RIC SUBSCRIPTION TYPE | M | | x.x.x.x | | YES | reject |

FIG.8

| IE/Group Name | Presence | Range | IE type and reference | Semantics description |
|---|---|---|---|---|
| Procedure Code | M | | INTEGER (0..255) | |
| Type of Message | M | | CHOICE(Initiating, Succesful, Unsuccesful, ...) | |

FIG.9

| IE/Group Name | Presence | Range | IE type and reference | Semantics description |
|---|---|---|---|---|
| RIC REQUEST ID | M | | INTEGER (0..65535) | |

FIG.10

| IE/Group Name | Presence | Range | IE type and reference | Semantics description |
|---|---|---|---|---|
| E2 NODE FUNTION ID | M | | INTEGER (0..4095) | |

FIG.11

| IE/Group Name | Presence | Range | IE type and reference | Semantics description |
|---|---|---|---|---|
| RIC SUBSCRIPTION TYPE | M | | INTEGER (0..255) | |

FIG.12

| IE/Group Name | Presence | Range | IE type and reference | Semantics description | Criticality | Assigned Criticality |
|---|---|---|---|---|---|---|
| INTERFACE AP ID | M | | INTEGER(0..255) | Protocol IDs for F1, E1, X2, XN, NGAP, S1, LTE-RRC, NR-RRC, etc. | YES | reject |
| Global Node ID | O | | | | YES | reject |
| MESSAGE PROTOCOL ID list | M | | | | YES | reject |
| > CHOICE SubscriptionMessageCondition | M | | | | | |
| >>All Message | | | | | | |
| >>Partial Message List | | | | | | |
| >>>SubscriptionMessage Information LIst | M | 1..\<maxnnofMsg\> | Subscription Message Information x.x.x.x | | - | - |
| >>>>Subscription Message Information | | | | | YES | reject |
| >>>>>Message ID | M | | | | YES | reject |
| >>>>>Interface Direction | O | | Enumerated (incoming, outgoing) | | YES | ignore |

FIG.13

| IE/Group Name | Presence | Range | IE type and reference | Semantics description | Criticality | Assigned Criticality |
|---|---|---|---|---|---|---|
| Message Type | M | | | | YES | reject |
| RIC REQUEST ID | M | | | | YES | reject |
| E2 NODE FUNTION ID | M | | | | YES | reject |
| >CHOICE SubscriptionMessageCondition | M | | | | | |
| >>All Messages | | | | | | |
| >>Partial Message List | | 1..maxnnofMsg | | | | |
| >>>Comlpete Failure Cause Information IDs | | | | | | |
| >>>List of message IDs | | | | | | |

FIG.14

APPARATUS AND METHOD FOR SERVICE SUBSCRIPTION THROUGH E2 INTERFACE IN RADIO ACCESS NETWORK COMMUNICATION SYSTEM

CROSS-REFERENCE TO RELATED APPLICATION(S)

This application is a continuation application, claiming priority under § 365(c), of an International application No. PCT/KR2020/013435, filed on Sep. 29, 2020, which is based on and claims the benefit of a U.S. Provisional application Ser. No. 62/908,827, filed on Oct. 1, 2019, in the U.S. Patent and Trademark Office, the disclosure of each of which is incorporated by reference herein in its entirety.

BACKGROUND

1. Field

The disclosure relates to a radio access network communication system. More particularly, the disclosure relates to an apparatus and a method for service subscription for an open radio access network (O-RAN) base station using an E2 message of the radio communication system.

2. Description of Related Art

To meet the demand for wireless data traffic having increased since deployment of 4th generation (4G) communication systems, efforts have been made to develop an improved 5$^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G system, new radio or next radio (NR) is commercialized to satisfy demand for wireless data traffic, and provide a high data rate service to a user through the 5G system like 4G, and it is also predicted that wireless communication services for various purposes such as internet of things and a service requiring high reliability for a specific purpose may be provided. Open radio access network (O-RAN) established by operators and equipment providers in a system where the current 4G communication system and the 5G system are mixed defines a new network element (NE) and an interface standard based on the existing 3rd generation partnership project (3GPP) standard, and suggests an O-RAN structure.

The above information is presented as background information only to assist with an understanding of the disclosure. No determination has been made, and no assertion is made, as to whether any of the above might be applicable as prior art with regard to the disclosure.

SUMMARY

As a 4th generation (4G)/5th generation (5G) communication system (hereafter, a 4G/5G system, new radio or next radio (NR)) is commercialized, a virtualized network requires a differentiated service support for users. Open-radio access network (O-RAN) newly defines the existing 3rd generation partnership project (3GPP) network entity (NE), radio unit (RU), distributed unit (DU), central unit (CU)-control plane (CP), and CU-user plane (UP) as O-RU, O-DU, O-CU-CP, and O-CU-UP respectively, and additionally standardizes a near-real-time RAN intelligent controller (RIC). The disclosure relates to an E2 subscription message for requesting a service from the newly defined RIC to the O-DU, the O-CU-CP or the O-CU-UP. In addition, the disclosure relates to a method for subdividing and processing an E2 subscription message based on a user equipment (UE), a group, a cell, and a network slice. Herein, the O-RU, the O-DU, the O-CU-CP, and the O-CU-UP may be understood as objects constructing the RAN which may operate according to the O-RAN standard, and may be referred to as E2 nodes.

Aspects of the disclosure are to address at least the above-mentioned and/or disadvantages and to provide at least the advantages described below. Accordingly, an aspect of the disclosure is to provide a method of a first node of a wireless communication system for generating and transmitting an E2 subscription request message at an RIC, setting, at an E2 NODE, a call processing event by receiving the E2 subscription request message by the RIC, successfully delivering a subscription request response message to the RIC after the EVENT setting, and generating an E2 INDICATION/REPORT message based on the generated EVENT if a call processing event satisfying the set condition occurs and delivering it to the RIC.

In addition, the E2 subscription request message may be identified based on a detailed information element of the E2 subscription request transmitted from the RIC, and the information element information may include MESSAGE TYPE identifier information, RIC REQUEST ID identifier information, E2 NODE FUNCTION ID identifier information, and RIC SUBSCRIPTION TYPE identifier information set based on the call processing function of the E2 NODE.

In addition, the E2 subscription response message may be identified based on a detailed information element of the E2 subscription response transmitted from the RIC, and the information element information may include MESSAGE TYPE identifier information, RIC REQUEST ID identifier information, E2 NODE FUNCTION ID identifier information, and RIC SUBSCRIPTION RESULT identifier information set based on the call processing function of the E2 node.

Additional aspects will be set forth in part in the description which follows and, in part, will be apparent from the description, or may be learned by practice of the presented embodiments.

In accordance with an aspect of the disclosure, a method performed by an E2 node is provided. The method includes receiving a radio access network (RAN) intelligent controller (RIC) subscription request message from an RIC via an E2 interface, and the RIC subscription request message may include information indicating a network interface type.

In accordance with another aspect of the disclosure, a method performed by an RIC is provided. The method includes transmitting an RIC subscription request message to an E2 node via an E2 interface, and the RIC subscription request message may include information indicating a network interface type.

In accordance with another aspect of the disclosure, an apparatus functioning as an E2 node is provided. The apparatus includes at least one transceiver, and at least one processor coupled with the at least one transceiver, the at least one processor may be configured to receive an RIC subscription request message from an RIC via an E2 interface, and the RIC subscription request message may include information indicating a network interface type.

In accordance with another aspect of the disclosure, an apparatus functioning as an RIC is provided. The apparatus includes at least one transceiver, and at least one processor coupled with the at least one transceiver, the at least one processor is configured to transmit an RIC subscription request message to an E2 node via an E2 interface, and the RIC subscription request message may include information indicating a network interface type.

An apparatus and a method according to various embodiments of the disclosure, may indicate a type of a network interface in a subscription request for requesting subscription of a radio access network (RAN) function of an E2 node, and thus provide an effective subscription procedure between a near real time (RT) RAN intelligent controller (RIC) and the E2 node.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8, 9, 10, 11, 12, 13, and 14 illustrate examples of messages used for a subscription procedure according to various embodiments of the disclosure.

Throughout the drawings, it should be noted that like reference numbers are used to depict the same or similar elements, features, and structures.

DETAILED DESCRIPTION

Figure 1:
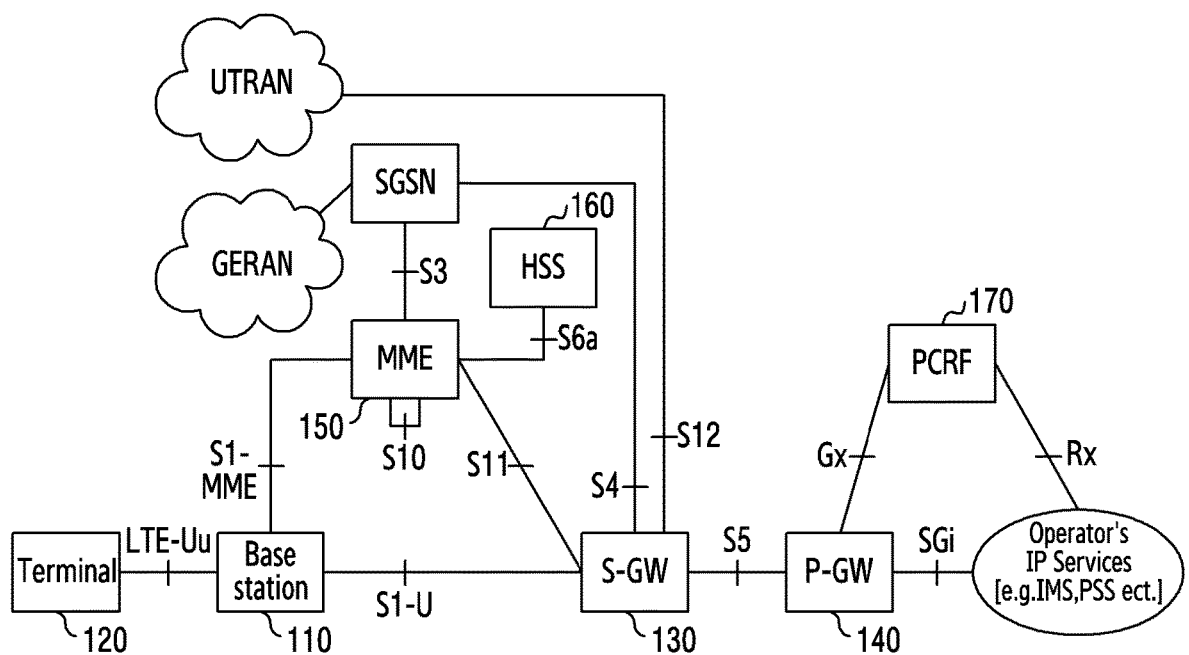
FIG. 1 illustrates an example of a 4th generation (4G) long term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein, including technical or scientific terms, may have the same meaning as those commonly understood by a person of ordinary skill in the technical field described in the disclosure. Among the terms used in the disclosure, terms defined in a general dictionary may be interpreted as having the same or similar meanings as those in the context of the related art, and unless explicitly defined in the disclosure, may not be interpreted as ideal or excessively formal meanings. In some cases, even terms defined in the disclosure may not be interpreted to exclude embodiments of the disclosure.

A hardware-based approach will be described as an example in various embodiments of the disclosure to be described hereafter. However, various embodiments of the disclosure include technology which uses both hardware and software, and accordingly various embodiments of the disclosure do not exclude a software-based approach.

Hereafter, the preset disclosure relates to an apparatus and a method for performing a subscription procedure between a device in a radio access network (RAN) and a device for controlling the RAN in a wireless communication system.

Terms for signals, terms indicating channels, terms indicating control information, terms indicating network entities, and terms indicating components of a device used in the following explanation are illustrated for convenience of description. Accordingly, the disclosure is not limited to the terms to be described, and other terms having the same technical meaning may be used.

In addition, the disclosure explains various embodiments using terms used in some communication standard (e.g., 3rd generation partnership project (3GPP)), but this is only an example for description. Various embodiments of the disclosure may be easily modified and applied in other communication systems.

Hereafter, an uplink indicates a radio link for transmitting data or a control signal from a user equipment (UE) or a mobile station (MS) to an evolved NodeB (eNode B, eNB) or a base station (BS), and a downlink indicates a radio link for transmitting data or a control signal from the eNode B to the UE in the disclosure. Also, the eNode B is an entity which performs resource allocation of the UE, and may be at least one of an eNode B, a Node B, a BS, a next generation node B (gNB) radio access unit, a BS controller, or a node on the network. The UE may include a UE, an MS, a cellular phone, a smart phone, a computer, or a multimedia system for performing a communication function.

A 5th generation (5G) communication system (hereafter, may be used interchangeably with a 5G system, a new radio or next radio (NR) system) is commercialized to satisfy demand for wireless data traffic, and provides a high data rate service to users through the 5G system like 4G, and it is also predicted that wireless communication services for various purposes such as internet of things and a service requiring high reliability for specific purposes may be provided.

Open-RAN (O-RAN) established by operators and equipment providers in a system where the current 4G communication system and the 5G system are mixed defines a new network element (NE) and an interface standard based on the existing 3GPP standard, and thus presents an O-RAN structure. The O-RAN newly defines the existing 3GPP network entity (NE), radio unit (RU), distributed unit (DU), central unit (CU)-control plane (CP), and CU-user plane (UP) as O-RU, O-DU, O-CU-CP, and O-CU-UP respectively, and besides, the O-RAN has standardized a near-real-time RAN intelligent controller (RIC) and a non-real-time (NRT) RIC. For example, the RIC may be a server intensively deployed at one physical place. In addition, the RIC may be a logical node for collecting information on a cell site transmitted and received by a UE and an O-DU, an O-CU-CP or an O-CU-UP. The O-DU and the RIC, the O-CU-CP and the RIC, and the O-CU-UP and the RIC may be connected via Ethernet. For doing so, an interface standard for communications between the O-DU and the RIC, between the O-CU-CP and the RIC, and between the O-CU-UP and the RIC are required, and message formats such as E2-DU, E2-CU-CP, E2-CU-UP requires procedure definitions between the O-DU, the O-CU-CP, the O-CU-UP and the RIC. In particular, differentiated service support is required for users in a virtualized network, and it is necessary to define functions of messages of E2-DU, E2-CU-CP and E2-CU-UP to support a service for wide cell coverage, by concentrating a call processing message/function generating in the O-RAN on the RIC.

Specifically, the RIC may generate and transmit an E2 subscription message to the O-DU, the O-CU-CP, or the O-CU-UP and thus set an event occurrence condition. The O-DU, the O-CU-CP, or the O-CU-UP may determine that the set condition is satisfied, load a 3GPP call processing message corresponding to the satisfied condition in a container to the RIC, classify into a user identifier, a cell identifier, a network slice identifier and so on, and then transmit through an E2 indication/report.

Call processing message information collected in the O-RAN based on the user identifier may be identified that the RIC is for a specific user/specific cell/specific network slice per interface (I/F). The collected information may be transmitted from at least one of the (O-)CU-CP, the (O-)CU-UP and the (O-)DU. The RIC may identify based on the user identifier that information collected from different entities is related to one specific user/specific cell/specific network slice, provide a specialized service to the specific user/specific cell/specific network slice with respect to a plurality of cells/network slices based on the collected information, and determine a key performance indicator (KPI) of the service provided to each user.

Since a general call processing service is restricted to a base station basis, the number of supportable cells is limited. In addition, since the collected information is limited to a specific base station, efficient monitoring on radio resources for the whole was not possible. According to various embodiments of the disclosure, the RIC may collect call processing messages (e.g., E1, F1, X2, XN, RRC, etc.) per I/F or respectively generated by the O-RU, the O-DU, the O-CU-CP or the O-CU-UP, and thus efficiently provide resource optimization and a user specific service or a user requested service with respect to the specific user/specific cell/specific network slice for wide cells. For example, the RIC may configure an additional carrier by efficiently dividing the network slice or by serving a specific terminal through carrier aggregation for the resource optimization, or configure an additional cell for performing dual access to serve a specific terminal through dual connectivity (DC). In addition, the RIC may configure a specific terminal to avoid connection with a specific cell and to connect with a specific cell in inter-cell movement. In addition, the RIC may efficiently perform the resource optimization through machine learning through analysis based on the collected information. In addition, the resource optimization of the disclosure is not limited to the described content. Also, according to the disclosure, it is possible not only to collect information per terminal but also to collect and analyze information per bearer.

The collected information of the specific user may be used at a collection server, the RIC or the NRT-RIC but may be also provided to an operations support system (OSS) or/and a business support system (BSS) to provide the specialized service to the user.

FIG. 1 illustrates an example of a 4th generation (4G) long term evolution (LTE) core system according to an embodiment of the disclosure.

Referring to FIG. 1, the LTE core system includes a base station 110, a terminal 120, a serving gateway (S-GW) 130, a packet data network gateway (P-GW) 140, a mobility management entity (MME). 150, a home subscriber server (HSS) 160, and a policy and charging rule function (PCRF) 170.

The base station 110 is a network infrastructure for providing radio access to the terminal 120. For example, the base station 110 is a device which performs scheduling by collecting status information such as a buffer status, an available transmission power, and a channel status of the terminal 120. The base station 110 has coverage defined as a specific geographic region based on a signal transmission distance. The base station 110 is connected to the MME 150 via an S1-MME interface. Besides the base station, the base station 110 may be referred to as an 'access point (AP)', an 'evolved NodeB (e NodeB, eNB)', a 'wireless point', a 'transmission/reception point (TRP)' or other term having the equivalent technical meaning.

The terminal 120 is a device used by the user, and performs communication with the base station 110 over a radio channel. In some cases, the terminal 120 may be operated without user's involvement. That is, at least one of the terminal 120 and the S-GW 130 is a device which performs machine type communication (MTC), and may not be carried by the user. Besides the terminal, the terminal 120 may be referred to as a 'UE', a 'mobile station', a 'subscriber station', a 'customer-premises equipment (CPE)', a 'remote terminal', a 'wireless terminal', or a 'user device' or other term having the equivalent technical meaning.

The S-GW 130 provides a data bearer, and generates or controls the data bearer under control of the MME 150. For example, the S-GW 130 processes a packet arriving from the base station 110 or a packet to be forwarded to the base station 110. In addition, the S-GW 130 may perform an anchoring role in handover of the terminal 120 between base stations. The P-GW 140 may function as a connection point to an external network (e.g., an internet network). In addition, the P-GW 140 allocates an internet protocol (IP) address to the terminal 120, and serves as an anchor for the S-GW 130. In addition, the P-GW 140 may apply quality of service (QoS) policy of the terminal 120, and manage account data.

The MME 150 manages mobility of the terminal 120. In addition, the MME 150 may perform authentication, bearer management, and the like on the terminal 120. That is, the MME 150 is responsible for mobility management and various control functions of the terminal. The MME 150 may interwork with a serving general packet radio service (GPRS) support node (SGSN).

The HSS 160 stores key information and a subscriber profile for the authentication of the terminal 120. The key information and the subscriber profile are transmitted from the HSS 160 to the MME 150 if the terminal 120 accesses the network.

The PCRF 170 defines a policy and a charging rule. The stored information is forwarded from the PCRF 180 to the P-GW 140, and the P-GW 140 may control the terminal 120 (e.g., QoS management, charging, etc.) based on the information provided from the PCRF 180.

Carrier aggregation (CA) technology is a technology which combines a plurality of component carriers, and transmits and receives at one terminal a signal using the plurality of the component carriers at the same time and thus increases frequency use efficiency in terms of the terminal or the base station. Specifically, according to the CA technology, the terminal and the base station may transmit and receive signals using a broadband using the plurality of the component carriers in the uplink (UL) and the downlink (DL), wherein the component carriers are located in different frequency bands respectively. Hereafter, the UL indicates a communication link through which the terminal transmits a signal to the base station, and the DL indicates a communication link through which the base station transmits a signal to the terminal. At this time, the numbers of uplink component carriers and downlink component carriers may be different.

Dual connectivity or multi connectivity is a technology for increasing the frequency use efficiency in terms of the terminal or the base station, in which one terminal is connected to a plurality of different base stations and transmits and receives signals simultaneously using carriers within the plurality of the base stations positioned in different frequency bands. The terminal may be connected to a first base station (e.g., a base station which provides services using the LTE technology or the 4G mobile communication technology) and a second base station (e.g., a base station which provides services using the NR technology or 5G mobile communication technology) at the same time to transmit and receive traffic. In this case, frequency resources used by each base station may be positioned in different bands. As such, the operation scheme based on the dual connectivity scheme of the LTE and the NR may be referred to as 5G non-standalone (NSA).

Figure 2A:
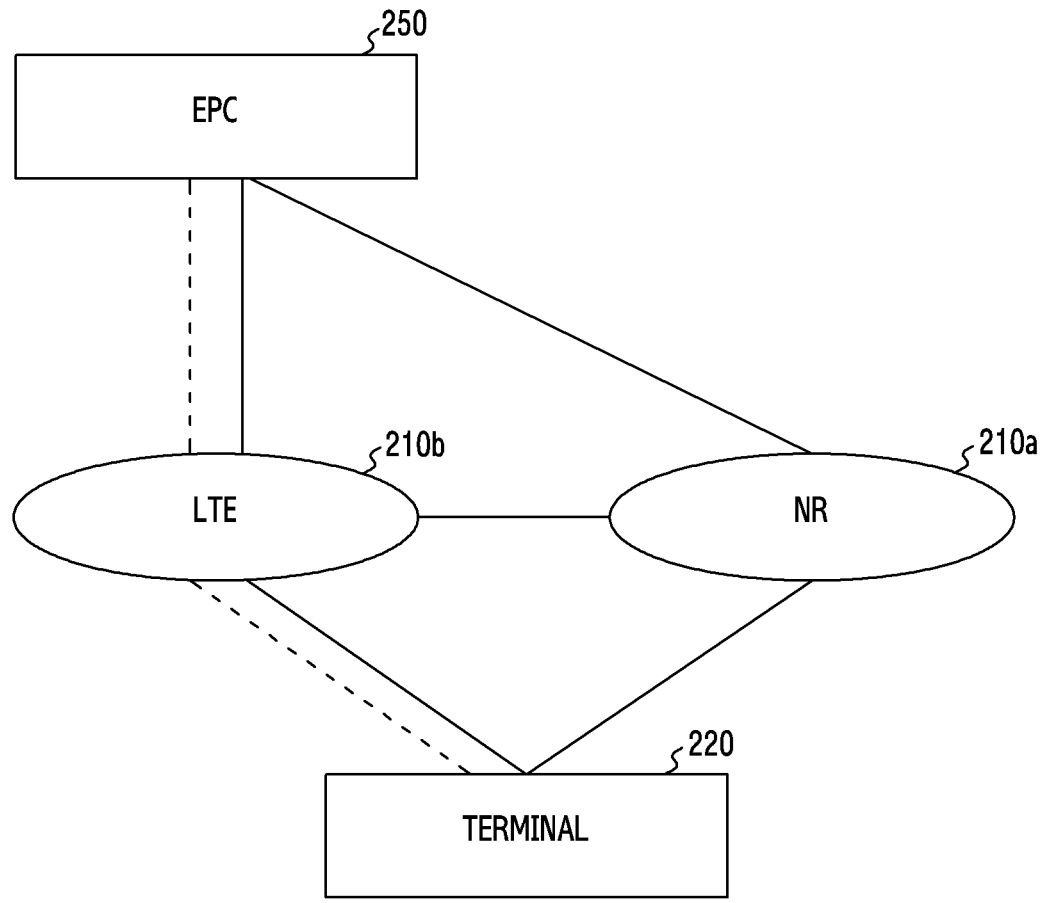
FIG. 2A illustrates an example of a 5th generation (5G) non-standard alone (NSA) system according to an embodiment of the disclosure.

FIG. 2A illustrates an example of a 5G NSA system according to an embodiment of the disclosure.

Referring to FIG. 2A, the 5G NSA system includes an NR RAN 210a, an LTE RAN 210b, a terminal 220, and an evolved packet core network (EPC) 250. The NR RAN 210a and the LTE RAN 210b are connected to the EPC 250, and the terminal 220 may be served by any one or both of the NR RAN 210a and the LTE RAN 210b at the same time. The NR RAN 210a includes at least one NR base station, and the LTE RAN 210b includes at least one LTE base station. Herein, the NR base station may be referred to as a '5G node', a 'gNB' or other term having the equivalent technical meaning. In addition, the NR base station may have a structure divided into a CU and a DU, and the CU may also have a structure divided into a CU-CP unit and a CU-UP unit.

In the structure shown in FIG. 2A, the terminal 220 may perform radio resource control (RRC) access through the first base station (e.g., a base station belonging to the LTE RAN 210b), and may be served with functions (e.g., connection management, mobility management, etc.) provided in the control plane. In addition, the terminal 220 may receive additional radio resources for transmitting and receiving data via a second base station (e.g., a base station belonging to the NR RAN 210a). This dual connectivity technology using the LTE and the NR may be referred to as evolved universal terrestrial radio access (E-UTRA)-NR (EN)—dual connectivity (DC). Similarly, the dual connectivity technology in which the first base station uses the NR technology and the second base station uses the LTE technology is referred to as NR-E-UTRA (NE)—DC. In addition, various embodiments may be applied to the multi connectivity and the CA technology of various types. In addition, various embodiments may be applicable even if a first system using a first communication technology and a second system using a second communication technology are implemented in one device or if the first base station and the second base station are located at the same geographic location.

Figure 2B:
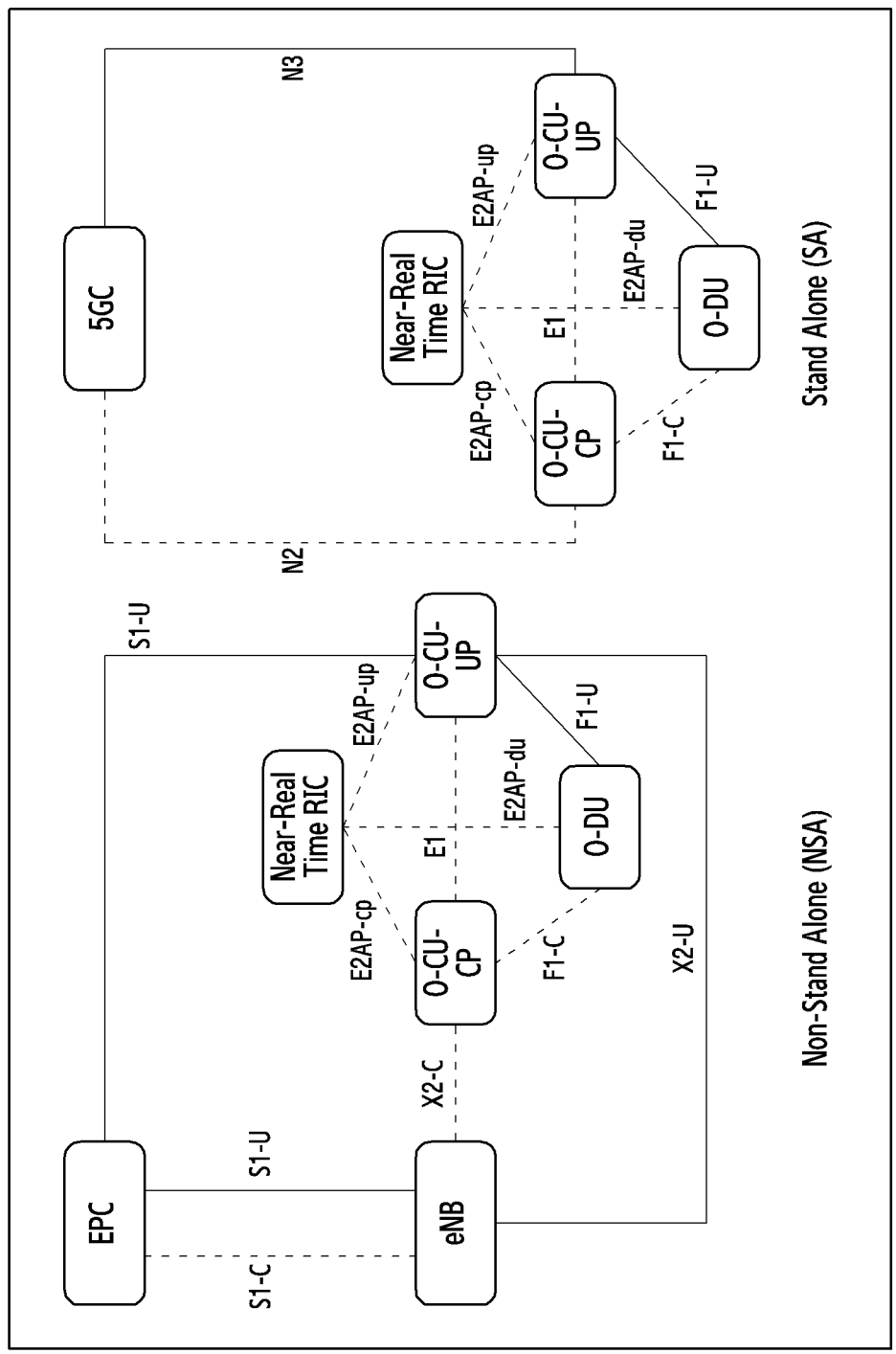
FIG. 2B illustrates an example of architecture for open (O)-radio access network (RAN) according to an embodiment of the disclosure.

FIG. 2B shows an architecture example for the O-RAN according to an embodiment of the disclosure.

For the sake of E2-SM-KPI monitoring (KPIMON) of an E2 service model, an O-RAN non-standalone in the multi-connectivity operation using the E-UTRA and the NR radio access technology is considered, whereas the E2 node may be assumed to be in an O-RAN standalone mode.

Referring to FIG. 2B, in deployment of the O-RAN non-standalone mode, the eNB is connected with the EPC via an S1-C/S1-U interface, and is connected with the O-CU-CP via an X2 interface. The O-CU-CP for the deployment of the O-RAN standalone mode may be connected with a 5G core (5GC) through an N2/N3 interface.

Figure 3:
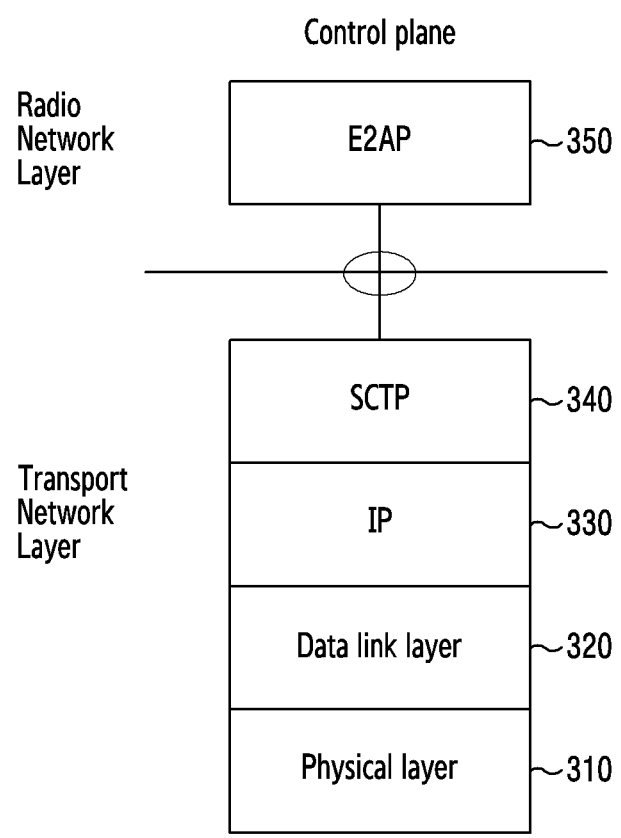
FIG. 3 illustrates a protocol stack of an E2 application protocol message in a radio access network according to an embodiment of the disclosure.

FIG. 3 illustrates a protocol stack of an E2 application protocol message in a radio access network according to an embodiment of the disclosure.

Referring to FIG. 3, a control plane includes a transport network layer and a radio network layer. The transport network layer includes a physical layer 310, a data link layer 320, an internet protocol (IP) layer 330, and a stream control transmission protocol (SCTP) layer 340.

The radio network layer includes an E2 application protocol (E2AP) 350. The E2AP 350 is used to deliver a subscription message, an indication message, a control message, a service update message, and a service query message, and is transmitted in a higher layer of the SCTP layer 340 and the IP layer 330.

Figure 4:
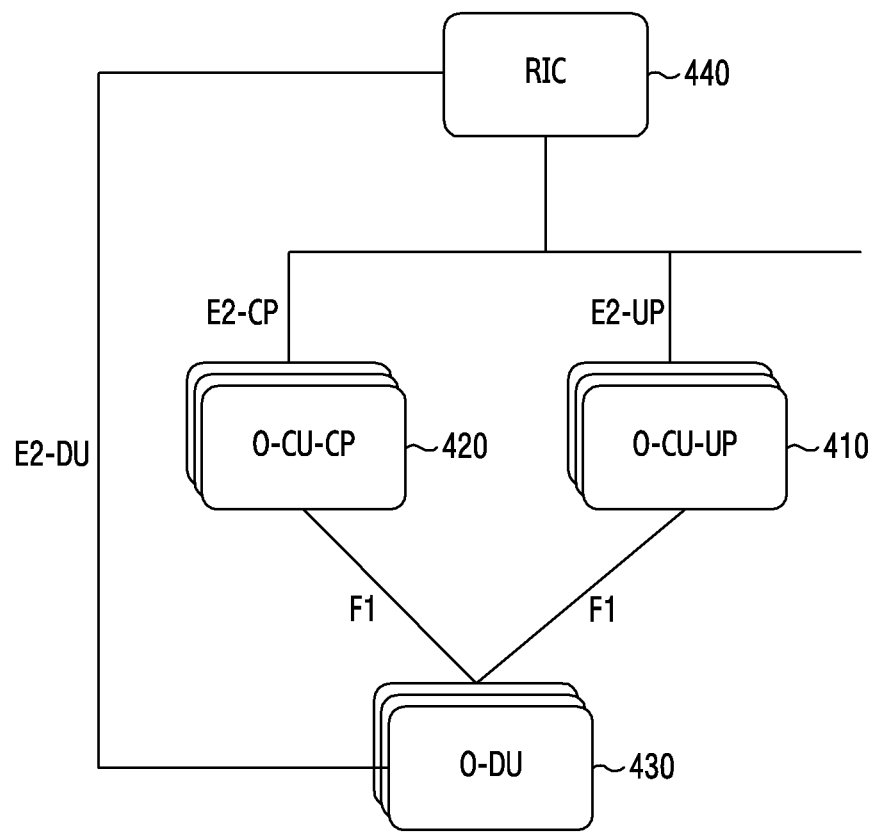
FIG. 4 illustrates an example of a connection between a base station and a radio access network (RAN) intelligence controller (RIC) in a radio access network according to an embodiment of the disclosure.

FIG. 4 illustrates an example of a connection between a base station and an RIC in a radio access network according to an embodiment of the disclosure.

Referring to FIG. 4, an RIC 440 is connected to an O-CU-CP 420, an O-CU-UP 410, and an O-DU 430. The RIC 440 is a device for controlling an RAN node (or a device for performing an RAN function, for example, the O-CU-CP 420, the O-CU-UP 410, and the O-DU 430). The RIC 440 may be defined as a deice for customizing RAN functionality for a new service or reginal resource optimization. The RIC 440 may provide functions such as network intelligence (e.g., policy enforcement, handover optimization), resource assurance (e.g., radio-link management, advanced self-organized-network (SON)), resource control (e.g., load balancing, slicing policy). The RIC 440 may communicate with the O-CU-CP 420, the O-CU-UP 410, and the O-DU 430. The RIC 440 may be connected to each node via E2-CP, E2-UP, and E2-DU interfaces. In addition, the interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be used interchangeably.

While FIG. 4 illustrates one RIC 440, a plurality of RICs may exist, according to various embodiments. The plurality of the RICs may be implemented with a plurality of hardware located at the same physical location or may be implemented through virtualization using single hardware.

Figure 5:
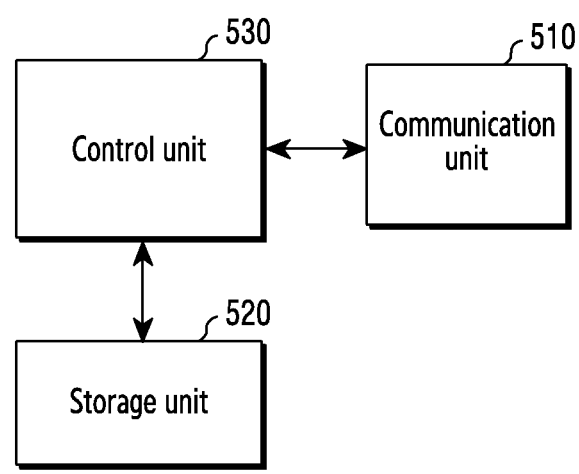
FIG. 5 illustrates a configuration of a device in a radio access network according to an embodiment of the disclosure.

FIG. 5 illustrates a configuration of a device according to an embodiment of the disclosure.

The structure illustrated in FIG. 5 may be understood as a configuration of a device having at least one function of the RIC, the O-CU-CP, the O-CU-UP, and the O-DU of FIG. 5. A term such as ' . . . unit' or ' . . . er' used hereafter indicates a unit for processing at least one function or operation, and may be implemented using hardware, software, or a combination of hardware and software.

Referring to FIG. 5, a core network device includes a communication unit 510 (e.g., a transceiver), a storage unit 520 (e.g., a memory), and a control unit 530 (e.g., a processor).

The communication unit 510 provides an interface for performing communication with other devices in the network. That is, the communication unit 510 converts a bit string transmitted from the core network device to other device into a physical signal, and converts a physical signal received from other device into a bit string. That is, the communication unit 510 may transmit and receive signals. Accordingly, the communication unit 510 may be referred to as a modem, a transmitter, a receiver, or a transceiver. In this case, the communication unit 510 enables the core network device to communicate with other devices or systems via a backhaul connection (e.g., wired backhaul or wireless backhaul) or over the network.

The storage unit 520 stores data such as a basic program, an application program, and setting information for the operations of the core network device. The storage unit 520 may include a volatile memory, a nonvolatile memory, or a combination of a volatile memory and a nonvolatile memory. The storage unit 520 provides the stored data according to a request of the control unit 530.

The control unit 530 controls general operations of the core network device. For example, the control unit 530 transmits and receives signals through the communication unit 510. In addition, the control unit 530 records and reads data in and from the storage unit 520. For doing so, the control unit 530 may include at least one processor. According to various embodiments, the control unit 530 may control the device to carry out operations according to various embodiments explained in the disclosure.

Figure 6:
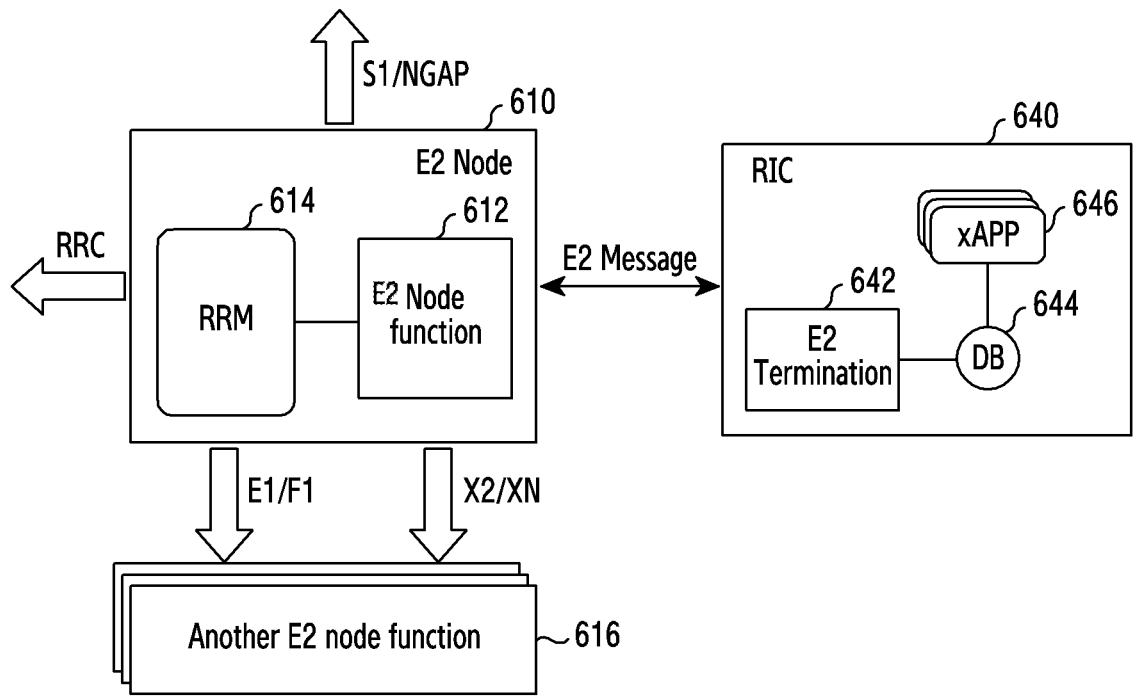
FIG. 6 illustrates logical functions related to E2 messages of an E2 node and an RIC in a radio access network according to an embodiment of the disclosure.

FIG. 6 illustrates logical functions related to E2 messages of an E2 node and an RIC in a radio access network according to an embodiment of the disclosure.

Referring to FIG. 6, an RIC 640 and an E2 node 610 may transmit or receive an E2 message with each other. For example, the E2 node 610 may be an O-CU-CP, an O-CU-UP, an O-DU, or a base station. A communication interface of the E2 node may be determined according to the type of the E2 node 610. For example, the E2 node 610 may communicate with another E2 node 616 through the E1 interface or the F1 interface. Alternatively, for example, the E2 node 610 may communicate with the E2 node 616 through an X2 interface or an XN interface. Alternatively, for example, the E2 node 610 may perform communication through an S1 interface or a next generation application protocol (NGAP) interface (i.e., an interface between a next generation (NG) RAN node and an access and mobility management function (AMF)).

The E2 node 610 may include an E2 node function 612. The E2 node function 612 is a function corresponding to a specific xApp (e.g., application software (S/W)) 646 installed in the RIC 640. For example, in the KPI monitor, KPI monitor collection S/W may be installed in the RIC 640, and the E2 node 610 may include the E2 node function 612 which generates KPI parameters, and then forwards an E2 message including the KPI parameters to an E2 termination 642 positioned at the RIC 640. The E2 node 610 may include a radio resource management (RRM) 614. The E2 node 610 may manage resources provided to the radio network for the terminal.

The E2 termination 624 positioned in the RIC 640, which is the termination of the RIC 640 for the E2 message, may perform a function of interpreting the E2 message forwarded by the E2 node 610 and then transferring it to the xApp 646. A database (DB) 644 positioned in the RIC 640 may be used for the E2 termination 624 or the xApp 646. The E2 node 610 shown in FIG. 6 is a termination of at least one interface, and may be understood as a termination of messages transmitted to a terminal, a neighbor base station, and a core network.

Figure 7A:
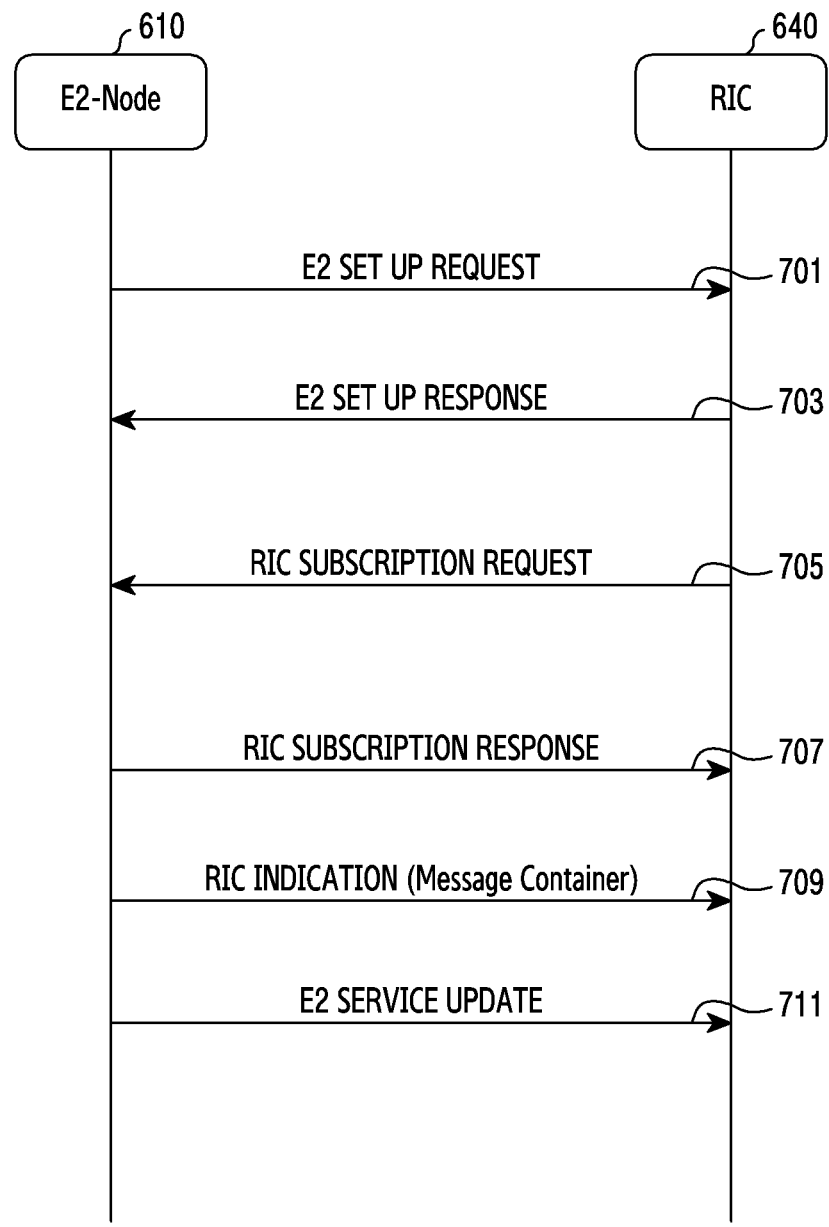
FIG. 7A illustrates an example of a signaling procedure between an E2 node and an RIC according to an embodiment of the disclosure.

FIG. 7A illustrates an example of a signaling procedure between an E2 node and an RIC according to an embodiment of the disclosure.

Specifically, FIG. 7A illustrates a setup procedure and an RIC subscription message relay procedure of E2 I/F between the E2 node and the RIC. The E2 node 610 is illustrated as the E2 node, and the RIC 640 is illustrated as the RIC.

Referring to FIG. 7A, the E2 node 610 may transmit an E2 setup request message to the RIC 640 in operation 701. An E2 NODE FUNCTION function positioned in the E2 node 610 finds the RIC using an RIC IP address which is set to operations, administration, and management (OAM) and transmits the E2 SET UP REQUEST message. The E2 SET UP REQUEST message includes RAN function definition which defines the function of the RAN supported by the E2 node, E2 node identifier (ID) information, and so on. An RAN function definition value is a value set to the OAM and the RIC may receive information of the set value with the OAM and determine which call processing function the E2 node supports with the RAN function definition value.

In operation 703, the RIC may receive an E2 setup response message from the E2 node. If accepting the E2 SETUP REQUEST message transmitted by the E2 node, the RIC may transmit the E2 SETUP RESPONSE message.

In operation 705, the RIC may transmit a subscription request message to the E2 node. A specific xApp positioned in the RIC requests the RIC E2 termination function to subscribe (or subscribe) for a specific RAN function definition function supported by E2. Herein, the subscription request message of operation 705 may be included in the E2 SETUP RESPONSE message of operation 703 and transmitted together, according to an embodiment. For example, the RAN function may include functions of X2AP, F1AP, E1AP, S1AP, and NGAP interfaces, or an internal RAN function for controlling UEs or cells.

In operation 707, the E2 node may transmit a subscription request response to the RIC. The E2 node function of the E2 node decodes the subscription request message, successfully sets the event condition requested by the RIC to the E2 node function and then transfers the subscription response to the RIC that the event trigger condition is successfully set.

In operation 709, the E2 node may transmit an E2 RIC indication message to the RIC. If a specific event condition occurs, the E2 node transfers the E2 RIC indication message to the RIC.

In operation 711, the E2 node may transmit a service update message to the RIC. If a change occurs in an E2 NODE function capability information element (E2 Node-Capa), the E2 node transmits the changed E2 NodeCapa in the E2 SERVICE UPDATE to the RIC.

Referring to FIG. 7A, the SET UP procedure, the RIC subscription procedure, the RIC indication procedure, and the update message transmission procedure are sequentially described, but various embodiments of the disclosure are not limited to the above-described order and procedures. That is, in some embodiments, the E2 node and the RIC may independently perform the E2 setup procedure of operations 701 through 703. In some embodiments, the E2 node and the RIC may independently perform the subscription procedure of operations 705 through 707. Meanwhile, according to another embodiment, the E2 setup response message may include the subscription request message, as described above. In some embodiments, the E2 node and the RIC may independently perform the RIC indication procedure of operation 709. Further, in some embodiments, the E2 node and the RIC may independently perform the RIC indication procedure of operation 709. In addition, the E2 node and the RIC may perform at least some of the above-described procedures together or separately.

Figure 7B:
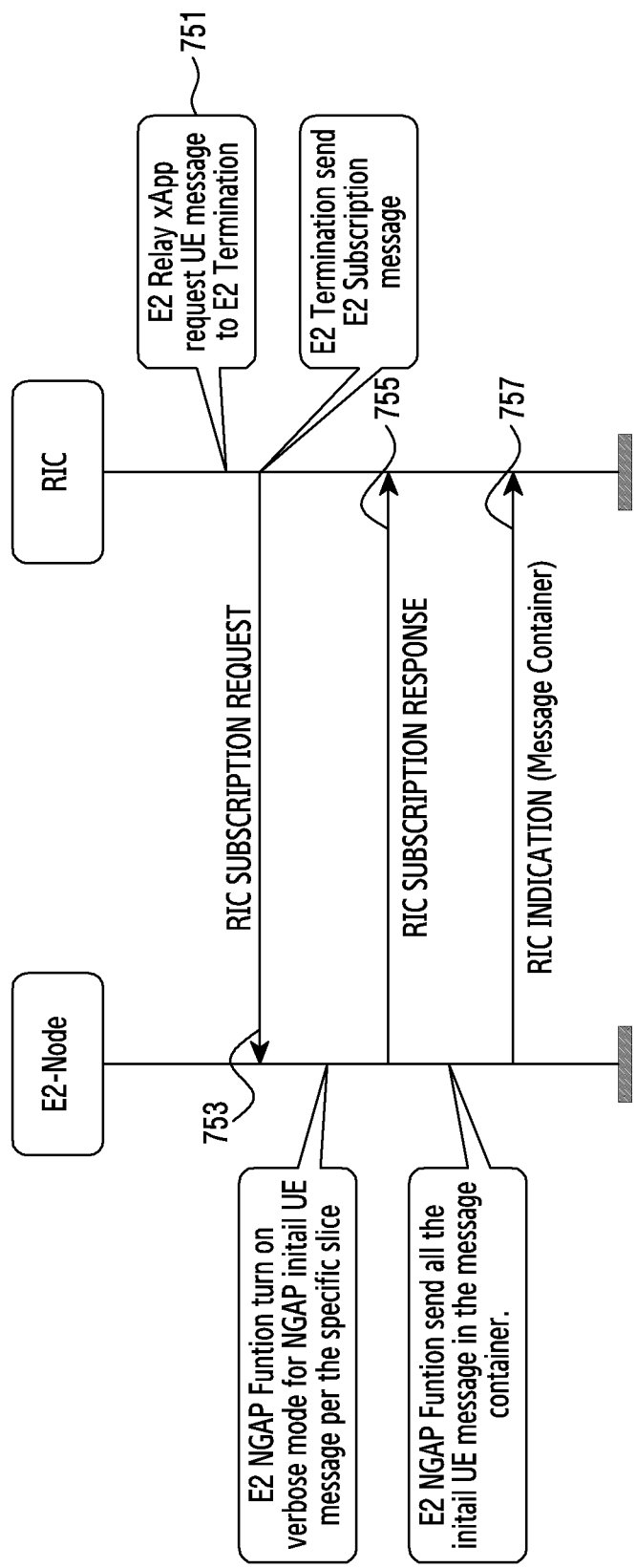
FIG. 7B illustrates an example of a subscription procedure between the E2 node and the RIC according to an embodiment of the disclosure.

FIG. 7B illustrates an example of the subscription procedure between the E2 node and the RIC according to an embodiment of the disclosure. The E2 node 610 is illustrated as the E2 node, and RIC 640 is illustrated as the RIC.

Referring to FIG. 7B, in operation 751, the RIC may request subscription from the E2 termination. For example, the E2 Relay xApp positioned in the RIC may request the subscription for the initial UE message in the NGAP I/F for the E2 Relay message function from the RIC E2 termination function.

In operation 753, the RIC may transmit an RIC subscription request to the E2 node. For example, the RIC E2 termination function generates an initial UE message relay message for the NGAP I/F requested in operation 751 as an E2 subscription request message and transfer it to the E2 node.

In operation 755, the E2 node may transmit an RIC subscription response to the RIC. Specifically, the E2 node function of the E2 node receiving the E2 subscription request message may decode the message, successfully set the event condition for transmitting to the RIC in a container including the RIC indication message per UE, per cell or per network slice if the initial UE message occurs in the NGAP I/F, and then transfer the subscription response to the RIC that the event trigger condition is successfully set.

In operation 757, the E2 node may transmit an RIC indication to the RIC. If an initial UE message occurs in the NGAP I/F by the UE, the E2 node may transfer the E2 RIC indication message including the NGAP initial UE message in the container to the RIC.

Some contents described in FIG. 7A may be applied to FIG. 7B in the same or similar manner.

FIG. 8 illustrates information elements (IEs) of an E2 subscription request message according to an embodiment of the disclosure.

Referring to FIG. 8, the first information element (IE) is Message Type, and Message Type has a unique value for each E2 message. Details of the Message Type are shown in FIG. 9.

The second IE designates a specific xApp with RIC REQUEST ID. Message details are shown in FIG. 10.

The third IE is E2 NODE FUNCTION ID. The E2 NODE FUNCTION ID may divide the range value for each E2 node and thus designate a specific E2 NODE FUNCTION to a specific E2 node. Message details are shown in FIG. 11.

The fourth IE is RIC SUBSCRIPTION TYPE and may set the event trigger condition by adding various types to the E2 node. Details of the event trigger condition type are shown in FIG. 12, and the E2 message relay defined in the disclosure is one of the event trigger condition types, and details of the message are shown in FIG. 13.

FIG. 9 is the details of Message Type IE according to an embodiment of the disclosure.

Referring to FIG. 9, the procedure code value which is the first IE, is an integer value with the range of 0 to 255, and a specific MESSAGE TYPE (PROCEDURE CODE) is set. For example, the procedure code value 0 may be set to subscription, the procedure code value 1 may be set to E2 SETUP configuration, and the procedure code value 2 may be set to the indication request message value from 0 to 255, that is, 256 possible message value configurations in total. For example, the O-RAN defines Table 1 below.

TABLE 1

| | |
|---|---|
| id-e2Subscription | ProcedureCode ::= 0 |
| id-e2Setup | ProcedureCode ::= 1 |
| id-e2Indication | ProcedureCode ::= 2 |
| id-e2Control | ProcedureCode ::= 3 |
| id-e2Serviceupdate | ProcedureCode ::= 4 |
| id-e2Servicequery | ProcedureCode ::= 5 |

Type of message which is the second IE in Message Type indicates the Message type, and may define initiating, successful, or unsuccessful messages.

FIG. 10 is an RIC REQUEST ID value according to an embodiment of the disclosure.

Referring to FIG. 10, the RIC REQUEST ID value is an integer value in the range of 0 to 65535, and may set a value unique to a specific xApp.

FIG. 11 is an E2 NODE FUNCTION ID value according to an embodiment of the disclosure.

Referring to FIG. 11, the E2 NODE FUNCTION ID value is an integer value in the range of 0 to 4095 and may be set by dividing the range value per E2 node.

TABLE 2

O-CU-CP (1~512)
O-CU-UP (513~1024)
O-DU (1025~1536)
O-RAN eNB (1537~2048)

The value after 2048 is the reserved value and may be set if an additional E2 node is added.

FIG. 12 is RIC SUBSCRIPTION TYPE value according to an embodiment of the disclosure.

Referring to FIG. 12, the RIC SUBSCRIPTION TYPE value is an integer value in the range of 0 to 255 and may be defined as a trigger value for a specific function of a specific E2 NODE FUNCTION of the E2 node. For example, the I/F-based message relay function may be defined as RIC SUBSCRIPTION TYPE 0.

FIG. 13 is an example of a detailed message for an E2 message relay function according to an embodiment of the disclosure.

Referring to FIG. 13, the first IE INTERFACE AP ID is an integer ranging 1 to 32, and designates a specific I/F. For example, up to 32 I/F may be defined in order of LTE-RRC of the UU interface between the UE and the LTE eNB to the setting value '0', the setting value of NR RRC of the UU interface between the 5G NR O-CU-CP and the terminal to '1', the F1 interface '2', the E1 interface '3', the X2 interface is '4', the XN interface '5', the NGAP interface '6', and S1 interface '7'.

The second IE global node ID is an optional IE, and if the X2 of LTE and XN I/F messages of 5G-NR are relayed and delivered, sets whether the other base station forwarding the X2 message is an LTE macro base station, a home eNB (HeNB) base station, or a 5G-NR base station.

The third IE is the MESSAGE PROCOL ID list, which may be classified into two types of "All Message" IE designating the relay for all messages per I/F, and partial message list IE designating the relay only for specific messages per I/F. The partial message list may designate up to 256 messages, and each message may be defined with message ID and optional interface direction defined in subscription message information. The message ID is a unique value defined for I/F in each LTE base station 5G NR base station in the 3GPP, and if a MESSAGE TYPE (PROCEDURE CODE) value of the 3GPP may be used, a value additionally defined by the O-RAN may also be used. Examples of values defined in the 3GPP are shown in Table 3 as below.

TABLE 3

| id-handoverPreparation | ProcedureCode ::= 0 |
| id-handoverCancel | ProcedureCode ::= 1 |
| id-loadIndication | ProcedureCode ::= 2 |
| id-errorIndication | ProcedureCode ::= 3 |
| id-snStatusTransfer | ProcedureCode ::= 4 |
| id-uEContextRelease | ProcedureCode ::= 5 |
| id-x2Setup | ProcedureCode ::= 6 |

Interface direction defined as the optional IE may be set for I/F messages which may be forwarded in both directions such as X2/XN, and may set whether the I/F message requesting the RIC to relay is an incoming message from other E2 node (e.g., an eNB, an O-CU-CP), or an outgoing message.

FIG. 14 is an example of a detailed message for an E2 relay subscription response function according to an embodiment of the disclosure.

Referring to FIG. 14, the first IE is Message Type and has a unique value for each E2 message. Details of the Message Type are shown in FIG. 9.

The second IE designates a specific xApp with RIC REQUEST ID. Details of the message are shown in FIG. 10.

The third IE is E2 NODE FUNCTION ID. The E2 NODE FUNCTION ID is divided into range values per E2 node, to designate a specific E2 NODE FUNCTION to a specific E2 node. Details of the message are shown in FIG. 11.

The fourth IE is a subscription message condition and is IE(s) which sets a failed message ID if the subscription procedure fails; if All message is set, it indicates that the I/F set in the E2 subscription request message INTERFACE AP ID is not available for the subscription, and if a partial message list is set, the subscription is not possible because it is limited to specific application protocol messages set in the list of message ID.

Through various embodiments of the disclosure, it is available to set the event condition (per I/F, per call processing function) in the call processing function of the O-RU, the O-DU, the O-CU-CP or the O-CU-UP, that is, the E2 node with the E2 SUBSCRIPTION message, to transfer 3GPP message to the RIC by including the 3GPP message in the container for a specific call processing function or every call processing function generated for each I/F, and thus it is available to provide the call processing request service of the RIC efficiently.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an E2 node, the method comprising:
receiving, from a radio access network (RAN) intelligent controller (RIC) via an E2 interface, an RIC subscription request message,
wherein the RIC subscription request message comprises first information indicating a network interface type, second information indicating a node identifier (ID), and third information indicating a message protocol ID for an interface, and
wherein, in case that the first information indicates an X2 interface, the node ID indicates one of an evolved NodeB (eNB) ID or a new radio (NR) base station ID.

2. The method of claim 1, wherein the network interface type comprises at least one of an F1 interface, an E1 interface, the X2 interface, an XN interface, a next generation (NG) interface, or an S1 interface.

3. The method of claim 1,
wherein the RIC subscription request message further comprises an RAN function ID, and
wherein the RIC subscription request message is a message for subscribing to a function corresponding to the RAN function ID of the E2 node.

4. The method of claim 1,
wherein the RIC subscription request message further comprises fourth information indicating an interface direction, and
wherein the interface direction comprises at least one of incoming or outgoing.

5. The method of claim 1, further comprising:
transmitting, to the RIC, an RIC subscription response message, for accepting the RIC subscription request message.

6. The method of claim 1,
wherein the RIC is a near real time (RT) RIC, and
wherein the E2 node comprises an open RAN (O-RAN) distributed unit (O-DU), an O-RAN central unit-control plane (O-CU-CP), an O-RAN central unit-user plane (O-CU-UP), or an O-RAN evolved NodeB (O-eNB).

7. A method performed by a radio access network (RAN) intelligent controller (RIC), the method comprising:
transmitting, to an E2 node via an E2 interface, an RIC subscription request message,
wherein the RIC subscription request message comprises first information indicating a network interface type, second information indicating a node identifier (ID), and third information indicating a message protocol ID for an interface, and
wherein, in case that the first information indicates an X2 interface, the node ID indicates one of an evolved NodeB (eNB) ID or a new radio (NR) base station ID.

8. The method of claim 7, wherein the network interface type comprises at least one of an F1 interface, an E1 interface, the X2 interface, an XN interface, an NG interface, or an S1 interface.

9. The method of claim 7,
wherein the RIC subscription request message further comprises an RAN function ID, and
wherein the RIC subscription request message is a message for subscribing to a function corresponding to the RAN function ID of the E2 node.

10. The method of claim 7,
wherein the RIC subscription request message further comprises fourth information indicating an interface direction, and
wherein the interface direction comprises at least one of incoming or outgoing.

11. The method of claim 7, further comprising:
receiving, from the E2 node, an RIC subscription response message, for accepting the RIC subscription request message.

12. The method of claim 7,
wherein the RIC is a near real time (RT) RIC, and
wherein the E2 node comprises an O-RAN distributed unit (O-DU), an O-RAN central unit-control plane (O-CU-CP), an O-RAN central unit-user plane (O-CU-UP), or an O-RAN evolved NodeB (O-eNB).

13. An E2 node, the comprising:
a transceiver; and
a controller coupled with the transceiver, and configured to:
receive, from a radio access network (RAN) intelligent controller (RIC) via an E2 interface, an RIC subscription request message,
wherein the RIC subscription request message comprises first information indicating a network interface type, second information indicating a node identifier (ID), and third information indicating a message protocol ID for an interface, and
wherein, in case that the first information indicates an X2 interface, the node ID indicates one of an evolved NodeB (eNB) ID or a new radio (NR) base station ID.

14. A radio access network (RAN) intelligent controller (RIC) comprising:
a transceiver; and
a controller coupled with the transceiver, and configured to:
transmit, to an E2 node via an E2 interface, an RIC subscription request message,
wherein the RIC subscription request message comprises first information indicating a network interface type, second information indicating a node identifier (ID), and third information indicating a message protocol ID for an interface, and
wherein, in case that the first information indicates an X2 interface, the node ID indicates one of an evolved NodeB (eNB) ID or a new radio (NR) base station ID.

15. The E2 node of claim 13, wherein the network interface type comprises at least one of an F1 interface, an E1 interface, the X2 interface, an XN interface, a next generation (NG) interface, or an S1 interface.

16. The E2 node of claim 13,
wherein the RIC subscription request message further comprises an RAN function ID, and
wherein the RIC subscription request message is a message for subscribing to a function corresponding to the RAN function ID of the E2 node.

17. The E2 node of claim 13,
wherein the RIC subscription request message further comprises fourth information indicating an interface direction, and
wherein the interface direction comprises at least one of incoming or outgoing.

18. The E2 node of claim 13, wherein the controller is further configured to:

transmit, to the RIC, an RIC subscription response message, for accepting the RIC subscription request message.

19. The E2 node of claim 13, wherein the RIC is a near real time (RT) RIC, and wherein the E2 node comprises an open RAN (O-RAN) distributed unit (O-DU), an O-RAN central unit-control plane (O-CU-CP), an O-RAN central unit-user plane (O-CU-UP), or an O-RAN evolved NodeB (O-eNB).

20. The RIC of claim 14, wherein the network interface type comprises at least one of an F1 interface, an E1 interface, the X2 interface, an XN interface, an NG interface, or an S1 interface.

21. The RIC of claim 14, wherein the RIC subscription request message further comprises an RAN function ID, and wherein the RIC subscription request message is a message for subscribing to a function corresponding to the RAN function ID of the E2 node.

22. The RIC of claim 14, wherein the RIC subscription request message further comprises fourth information indicating an interface direction, and wherein the interface direction comprises at least one of incoming or outgoing.

23. The RIC of claim 14, wherein the controller is further configured to:

receive, from the E2 node, an RIC subscription response message, for accepting the RIC subscription request message.

24. The RIC of claim 14, wherein the RIC is a near real time (RT) RIC, and wherein the E2 node comprises an O-RAN distributed unit (O-DU), an O-RAN central unit-control plane (O-CU-CP), an O-RAN central unit-user plane (O-CU-UP), or an O-RAN evolved NodeB (O-eNB).

* * * * *